(12) United States Patent
Kooy et al.

(10) Patent No.: US 6,217,451 B1
(45) Date of Patent: Apr. 17, 2001

(54) TORSIONAL VIBRATION DAMPER

(75) Inventors: Ad Kooy, Lauf; Hartmut Mende, Sinzheim; Johann Jäckel, Baden-Baden; Andreas Raimann, Inzlingen, all of (DE)

(73) Assignee: LuK Lamellen und Kupplungsbau GmbH, BuhI (DE)

( * ) Notice: Subject to any disclaimer, the term of this patent is extended or adjusted under 35 U.S.C. 154(b) by 0 days.

(21) Appl. No.: 09/263,293

(22) Filed: Mar. 5, 1999

(30) Foreign Application Priority Data

Mar. 7, 1998 (DE) .............................. 198 09 894

(51) Int. Cl.$^7$ ...................................... F16D 3/52
(52) U.S. Cl. ................ 464/68; 464/64; 464/67; 464/66
(58) Field of Search ................ 464/64, 66, 67, 464/68; 192/203, 213; 267/168, 179, 290

(56) References Cited

U.S. PATENT DOCUMENTS

| | | | |
|---|---|---|---|
| 4,987,980 | * 1/1991 | Fujimoto | 192/3.28 |
| 5,367,919 | 11/1994 | Schulte . | |
| 5,377,796 | 1/1995 | Friedmann et al. . | |
| 5,456,634 | 10/1995 | Maucher et al. . | |
| 5,464,198 | * 11/1995 | Yanko et al. | 267/167 |
| 5,642,875 | 7/1997 | Albers et al. . | |
| 5,709,371 | * 1/1998 | Balsells | 267/167 |
| 5,771,755 | * 6/1998 | Ducles et al. | 75/574 |
| 5,882,264 | * 3/1999 | Yabe et al. | 464/64 |

FOREIGN PATENT DOCUMENTS 42 29 416   3/1993   (DE) .

* cited by examiner

*Primary Examiner*—B. Dayoan
*Assistant Examiner*—Aaron Dunwoody
(74) *Attorney, Agent, or Firm*—Darby & Darby

(57) ABSTRACT

The coil springs of an arcuate energy storing device in a torsional vibration damper are fitted into each other in such a way that at least one convolution of the inner spring engages at least one convolution of the outer spring when the energy storing device is caused to store energy (or to store additional energy) and/or is permitted to dissipate energy while the damper is in actual use, e.g., between the primary and secondary flywheels of a composite flywheel in the power train of a motor vehicle. The at least one convolution of the outer spring can be facetted and/or deformed for reliable engagement with the at least one convolution of the inner spring, and the at least one convolution of the inner spring can have a circular or a non-circular outline. The at least one convolution of the inner spring can engage one or more end convolutions or one or more intermediate convolutions of the outer spring.

39 Claims, 3 Drawing Sheets

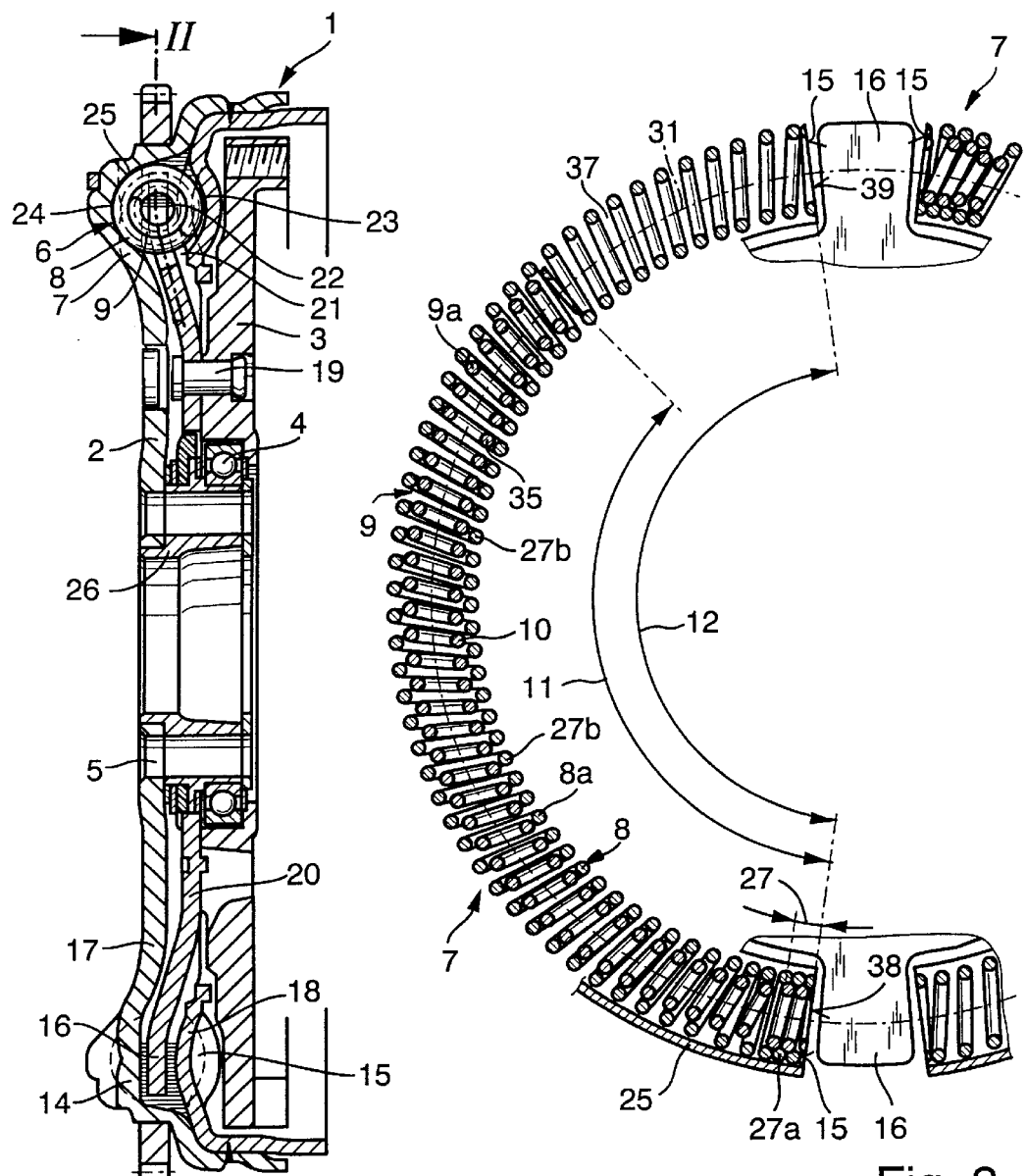
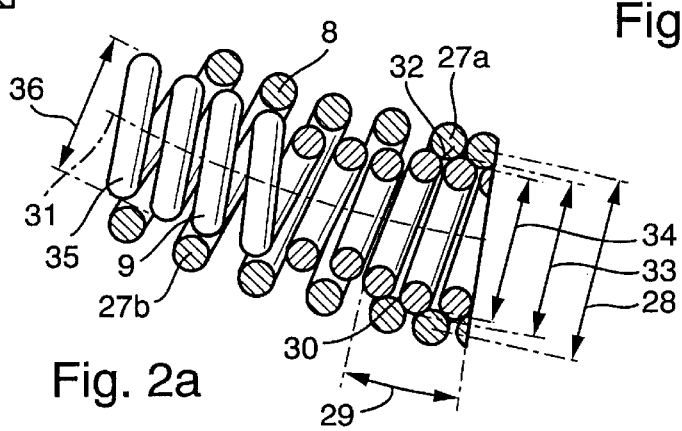
Fig. 1
Fig. 2
Fig. 2a

TORSIONAL VIBRATION DAMPER

BACKGROUND OF THE INVENTION

The present invention relates to dampers in general, and more particularly to improvements in torsional vibration dampers which can be utilized in the power trains of motor vehicles, for example, to at least partially absorb shocks between the rotary output element of a prime mover (such as the camshaft or crankshaft of an internal combustion engine) and the housing of a friction clutch which is engageable to transmit torque to the rotary input element of a change-speed transmission. Still more particularly, the invention relates to improvements in torsional vibration dampers wherein an input member and an output member are rotatable with each other about a common axis as well as relative to each other against the opposition of one or more energy storing devices.

Commonly owned U.S. Pat. No. 5,377,796 (granted Jan. 3, 1995 to Oswald Friedmann et al. for "APPARATUS FOR TRANSMITTING FORCE BETWEEN ROTARY DRIVING AND DRIVEN UNITS") discloses a hydrokinetic torque converter wherein a torsional vibration damper is installed in a composite flywheel, namely between a primary flywheel which receives torque from the crankshaft or camshaft of an internal combustion engine and a secondary flywheel which drives the housing and the pump of the torque converter. The damper comprises a rotary input member which includes or is driven by the primary flywheel, a rotary output member which includes or drives the secondary flywheel, and an energy storing device which opposes rotation of the input and output members relative to each other. The energy storing device comprises at least two coil springs one of which is confined in the other. The length of the one coil spring matches or approximates that of the other coil spring.

U.S. Pat. No. 5,367,919 discloses a similar torsional vibration damping apparatus which also comprises coaxial primary and secondary flywheels and an energy storing device serving to oppose rotation of the flywheels relative to each other. The secondary flywheel can be coupled to the input shaft of a change-speed transmission by an engageable and disengageable friction clutch. The two flywheels carry spring-engaging portions which cause the energy storing device to store energy, or to store additional energy, when the two flywheels are caused to turn relative to each other.

The disclosure of each patent application and/or patent identified in this specification is incorporated herein by reference. This includes our German priority application Serial No. 198 09 894.4 filed Mar. 7, 1998.

A drawback of many presently known torsional vibration dampers is that they are too bulky, too expensive and/or insufficiently versatile. Moreover, the springs (such as coil springs) of energy storing devices in such conventional torsional vibration dampers are not, or cannot be, used to capacity under all circumstances of use which arise in the power train of a motor vehicle or in other fields in which the utilization of one or more torsional vibration damping apparatus is advisable or necessary.

OBJECTS OF THE INVENTION

An object of the invention is to provide a novel and improved energy storing device for use in torsional vibration dampers.

Another object of the invention is to provide a novel and improved combination of springs which can be employed in the energy storing devices of torsional vibration dampers for use in composite flywheels, between the engine and the clutch in the power train of a motor vehicle, and/or for many other purposes.

A further object of the invention is to provide a torsional vibration damper with one or more energy storing devices which is or are more versatile than heretofore known energy storing devices and which can be put to use under circumstances likely to vary within a wide range, e.g., while a motor vehicle is pulling a load, is idling or is coasting.

An additional object of the invention is to provide a torsional vibration damper with one or more energy storing devices which can be mass produced at a reasonable cost in available machinery and which can be utilized as a superior substitute for presently known energy storing devices.

Still another object of the invention is to provide an energy storing device which can be readily designed and/or modified to be put to optimal use under widely different circumstances.

A further object of the invention is to provide an energy storing device which is constructed and assembled in such a way that its characteristics (particularly its resistance to rotation of the input and output members of a torsional vibration damper relative to each other) can readily and accurately and optimally conform to the circumstances of use of the torsional vibration damper.

Another object of the invention is to provide an energy storing device which can be readily designed to offer different resistances during different stages of rotation of the input and output members of a torsional vibration damper relative to each other.

An additional object of the invention is to provide a torsional vibration damping device whose inertia is low and wherein such desirable feature is attributable, at least in part, to a novel design of its energy storing device or devices.

Still another object of the invention is to provide a power train which embodies at least one torsional vibration damper and at least one energy storing device of the above outlined character.

A further object of the invention is to provide a novel and improved method of assembling the springs of an energy storing device for use in a torsional vibration damper.

An additional object of the invention is to provide a novel and improved method of configurating the input and/or the output member of a torsional vibration damper.

SUMMARY OF THE INVENTION

One feature of the present invention resides in the provision of a torsional vibration damper which comprises input and output members rotatable with and relative to each other in clockwise and counterclockwise directions about a predetermined axis and respectively include at least two first and at least two second stressing components in the form of shoulders, arms, pockets or the like. The improved damper further comprises at least one energy storing device which is arranged to oppose rotation of the input and output members relative to each other. The energy storing device has first and second ends each abutting one of the first and one of the second stressing components, and such ends are spaced apart from each other in the circumferential direction of the input and output members. The novel and improved energy storing device comprises a first coil spring between the ends of the energy storing device, and a second coil spring confined at least in part in an arcuate space defined by the first coil spring. The two coil springs have a common arcuate axis and the first and second coil springs respectively include or consist of a plurality of first and second helical convolutions. At least one of the first convolutions cooperates with at least one of the second convolutions to compel the at least one second convolution to share movements of the at least one first convolution in at least one of the aforementioned (clockwise and counterclockwise) directions.

The at least one first convolution and the at least one second convolution can overlie each other in a plane which is at least substantially normal to the common axis of the coil springs, and such plane can include the common axis of the input and output members.

In accordance with one presently preferred embodiment, the first convolutions can have identical or practically identical inner diameters, and the cooperation between the first and second coil springs is or can be arrived at in that the at least one second convolution has a radially outermost portion which is spaced apart from the common axis of the coil springs by a distance exceeding one-half of one of the inner diameters, i.e., the at least one second convolution is in frictional or force-locking or form-locking engagement with the at least one first convolution.

The at least one first convolution can constitute an outermost convolution of the first coil spring, and the at least one second convolution can constitute an outermost convolution of the second coil spring.

The second coil spring can be shorter than the first coil spring (as seen in the direction of the common axis of the two springs), i.e., at least a portion of the arcuate space in the first coil spring is empty, at least in the unstressed condition of the energy storing device.

The wire of which the first coil spring consists can be convoluted in a clockwise direction, and the wire of which the second coil spring consists can be convoluted in the same direction as the wire of the first coil spring or in the opposite (counterclockwise) direction.

The torsional vibration damper can be assembled in such a way that the input and output members are rotatable relative to each other from neutral positions in which the energy storing device stores a minimal amount of energy; in such dampers, the at least one first convolution and the at least one second convolution can be located at one end of the energy storing device, and the at least one first convolution contacts the at least one second convolution at least in the neutral positions of the input and output members.

The at least one first convolution and/or the at least one second convolution (e.g., the at least one second convolution) can have a non-circular (e.g., an oval) shape. Such non-circular shape can be arrived at by deforming an originally circular first convolution and/or an originally circular second convolution.

The non-circular shape can be imparted to an originally circular first convolution and/or to an originally circular second convolution in a suitable cold forming machine.

At least the at least one second convolution can be a force fit in the first coil spring. This can be achieved, for example, by deforming the resilient second coil spring during introduction into the first coil spring and/or by deforming a resilient first coil spring during introduction of the second coil spring into the internal space of the first coil spring. This ensures that the at least one second coil spring is a force fit in the first coil spring. The at least one first convolution can be enlarged as a result of force fitting of the at least one second convolution into the first coil spring, or such force fitting can result in a reduction of the size of the at least one first convolution.

If at least one of the coil springs is elastic, the at least one second convolution can engage the at least one first convolution (and/or vice versa) by snap action.

The at least one second convolution can be threaded into the first coil spring.

Furthermore, the first coil spring can have a first lead and the second coil spring can have a different second lead.

The wires of which the coil springs consist can be convoluted in the same direction or in opposite directions.

If the wire of which at least one of the coil springs is made consists of a resilient material, the introduction of the second coil spring into the first coil spring can entail a deformation of the at least one coil spring by the other coil spring so that at least a portion of the at least one first convolution and/or of the at least one second convolution is deformed in a direction at least substantially radially of the common axis of the two coil springs.

At least one of the coil springs can be precurved, i.e., it need not be bent at all, or it need not be bent to a considerable extent, during assembly of the energy storing device and/or during mounting of the energy storing device between the respective first and second stressing components of the input and output members of the improved torsional vibration damper.

The radius of curvature of the first coil spring can equal or approximate the radius of curvature of the second coil spring.

The outer diameter of the first coil spring can be a relatively small (even a minute) fraction of the length of the common axis of the first and second coil springs. For example, the outer diameter of the first coil spring can be between 5% and 10% of the length of the common axis.

The input and/or the output member of the torsional vibration damper can include or constitute or form part of a flywheel.

The at least one first convolution can be provided with at least one facet, flat or an analogous cofiguration, and the at least one second convolution can abut such facet or flat. The facetted first convolution can be disposed at one of the two ends of the energy storing device.

At least one end convolution of the first coil spring and/or the adjacent end convolution of the second coil spring can consist of a wire having a diameter which is relatively large in comparison with the lead of the respective convolution; the aforementioned facet or flat can be provided on such end convolution of the first and/or second coil spring. The facet can be located in a plane which is normal or substantially normal to the common axis of the coil springs.

If the facet or flat is provided on a first convolution, such facet can at least partially surround the at least one second convolution.

The at least one first convolution and the at least one second convolution can be disposed at a locus which is spaced apart from the ends of the energy storing device. The stressing components of the input and output members of the torsional vibration damper employing the just described energy storing device can be arranged to stress at least some convolutions of the first coil spring prior to stressing of one or more second convolutions in response to rotation of the input and output members relative to each other.

Another feature of the invention resides in the provision of an arcuate energy storing device for use in a torsional vibration damper. The energy storing device comprises at least one arcuate first coil spring having first convolutions defining an arcuate space, and at least one second arcuate coil spring having second convolutions and being at least partially received in the arcuate space of the first coil spring. At least one of the second convolutions in the arcuate space extends beyond at least one adjacent first convolution as seen radially of the common arcuate axis of the first and second coil springs.

A further feature of the invention resides in the provision of a torsional vibration damper which comprises an energy storing device including a first arcuate coil spring defining an internal space and having a first set of convolutions including an end convolution having an internal facet, and a second arcuate coil spring which is at least partially received in the internal space and has a second set of convolutions including at least one convolution which is at least partially surrounded by the aforementioned facet. The outer diameter of the at least one convolution of the second set of convolutions can be greater than the inner diameter of the end convolution of the first set of convolutions.

An additional feature of the invention resides in the provision of a torsional vibration damper comprising an energy storing device having a first end and a second end and including a first arcuate coil spring which defines an internal space and has a first set of convolutions including end convolutions at the ends of the energy storing device and intermediate convolutions between the end convolutions. The energy storing device further includes a second arcuate coil spring which is at least partially received in the internal space of the first coil spring and has a second set of convolutions including at least one second convolution cooperating with at least one intermediate convolution of the first coil spring to couple the first and second coil springs to each other for joint movement of the at least one intermediate convolution and the at least one second convolution in a direction toward at least one end of the energy storing device.

The just described torsional vibration damper further comprises input and output members (such as the aforementioned primary and secondary flywheels of a composite flywheel in the power train of a motor vehicle) which are rotatable with and relative to each other about a predetermined axis and have arms, pockets, shoulders and/or otherwise configurated stressing components abutting at least the end convolutions of the first set of convolutions prior to abutting at least some convolutions of the second set in response to rotation of the input and output members of the torsional vibration damper relative to each other.

The novel features which are considered as characteristic of the invention are set forth in particular in the appended claims. The improved torsional vibration damper itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is an axial sectional view of a torsional vibration damper employing energy storing devices which are constructed an assembled in accordance with one embodiment of the invention;

FIG. 2 is a fragmentary transverse sectional view of the torsional vibration damper substantially as seen in the direction of arrows from the line II—II of FIG. 1;

FIG. 2a is an enlarged view of a detail in the lower part of FIG. 2;

FIG. 3 is an end elevational view of an energy storing device constituting a first modification of the energy storing devices in the torsional vibration damper shown in FIGS. 1, 2 and 2a;

DESCRIPTION OF PREFERRED EMBODIMENTS

Figure 3:
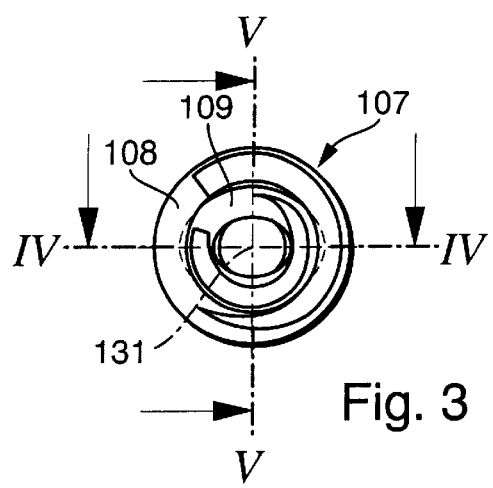
Figure 4:
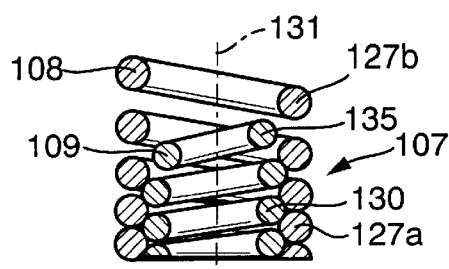
FIG. 4 is an axial sectional view as seen in the direction of arrows from the line IV—IV in FIG. 3.
Figure 5:
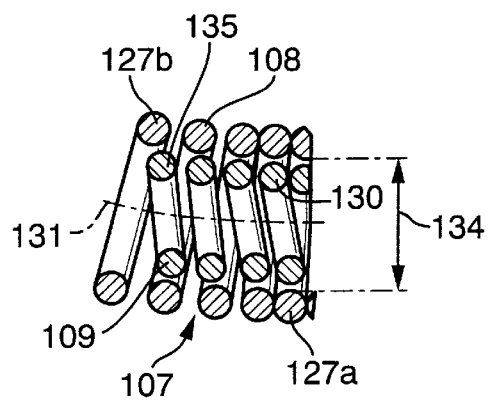
FIG. 5 is a sectional view substantially as seen in the direction of arrows from the line V—V in FIG. 3.

The torsional vibration damper 1 which is shown in FIGS. 1 and 2 constitutes a composite flywheel including a first or primary flywheel 2 adapted to be affixed to the rotary output element of a prime mover in the power train of a motor vehicle, and a second or secondary flywheel 3 which can transmit torque to the housing of a friction clutch. When engaged, the clutch can transmit torque to the rotary input element of a change speed transmission in the power train of the motor vehicle. Reference may be had, for example, to commonly owned U.S. Pat. No. 5,456,634 (granted Oct. 10, 1995 to Paul Maucher et al. for "TORSION DAMPING APPARATUS FOR USE WITH FRICTION CLUTCHES IN THE POWER TRAINS OF MOTOR VEHICLES") which shows the manner in which a torsional vibration damper can be installed between the crankshaft or camshaft of a combustion engine and the housing of a friction clutch serving to transmit torque to the input shaft of a transmission.

A ball bearing 4 is installed between the flywheels 2, 3 radially inwardly of a set of axially parallel holes 5 provided in the hub of the primary flywheel 2 and serving to receive the shanks of fasteners which are utilized to secure the primary flywheel to the output element of the prime mover.

The radially outer portions of the flywheels 2, 3 define an annular chamber 6 for two elongated arcuate energy storing devices 7 each of which comprises a first arcuate coil spring 8 and a second arcuate coil spring 9 received in the arcuate internal space 37 of the respective spring 8. In the embodiment of FIGS. 1 and 2, the second coil spring 9 of each damper 7 is considerably shorter than and is fully received in the internal space 37 of the respective first coil spring 8. Since the two energy storing devices 7 of the illustrated damper 1 are identical with and are installed as mirror images of each other, only one is shown in its entirety and will be described in full detail.

The coil spring 8 is made of resilient metallic wire having a circular cross-sectional outline and forming a plurality of helical convolutions 8a surrounding the internal space 37 and including end convolutions 27a at both ends 38, 39 of the energy storing device 7. The coil spring 9 is also made of resilient metallic wire having a circular cross-sectional outline (with a diameter which may but need not be identical to that of the wire forming the convolutions 8a) and being wound to define a plurality of helical convolutions 9a including an end convolution 30 at the end 38 of the device 7. The length 11 of the spring 9 (as measured along the common arcuate axis 31 of the springs 8 and 9) is considerably less than the length 12 of the spring 8. The difference between the lengths 11 and 12 can be in the range of between about 30° and 90°, preferably between about 45° and 70°. Each of these ranges can be lengthened or shortened without departing from the spirit of the invention.

The spring 9 is a rather snug fit in the space 37 of the spring 8 but a majority of the convolutions 9a are slidable along the adjacent convolutions 8a and vice versa.

The primary flywheel 2 constitutes the input member of the damper 1 and has several angularly spaced-apart stressing components 14, 15 for the ends 38, 39 of the energy storing devices 7. The secondary flywheel 3 forms part of the output member of the damper 1 and has several circumferentially spaced-apart stressing components 16 for the ends of the devices 7. The primary flywheel 2 includes two substantially radially extending sheet metal walls 17, 18 which respectively include the portions 14 and 15 of the stressing components of the primary flywheel. The portions 14, 15 constitute toothed, pocket-shaped, shouldered or otherwise configurated portions of the respective walls 17, 18 and their function is to cooperate with the stressing members 16 in order to cause the energy storing devices 7 to store energy or to store additional energy when the flywheels 2 and 3 are caused to move (clockwise or counterclockwise) from their starting or neutral positions in which the devices 7 store minimal amounts of energy.

Each stressing component 16 is installed between the portions 14, 15 of a stressing component on the primary flywheel 2, and the stressing components 16 which are shown in FIGS. 1 and 2 are radially outwardly extending projections or arms of a disc-shaped member 20 which is fixedly secured to the secondary flywheel 3 by a set of rivets 19. The member 20 serves to transmit torque between the energy storing devices 7 and the secondary flywheel 3 when the flywheel 2 drives the flywheel 3 while the motor vehicle is in the process of pulling a load as well as when the motor vehicle is coasting (i.e., when the flywheel 3 drives the flywheel 2 and the output element of the engine).

The walls 17, 18 and the disc-shaped member 20 can constitute metallic blanks which are converted in a suitable cold forming machine. The wall 17 is directly or indirectly affixed to the output element of the engine and thus carries all other parts of the damper 1 as well as the clutch (not shown) which is carried by the secondary flywheel 3. The radially outer portions of the walls 17, 18 are welded or otherwise reliably affixed to each other and define the aforementioned annular chamber 6 which is open at 21 to provide room for the stressing components or arms 16 which extend into the toroidal portion 22 of the chamber 6 and between the two energy storing devices 7 in such chamber.

At least a portion of the chamber 6 can be filled with a viscous fluid, e.g., with a suitable grease which accumulates in the radially outermost portion of the chamber, at least when the composite flywheel of the damper 1 is rotated by the engine of the motor vehicle. The walls 17, 18 have arcuate recesses 23, 24 which actually define the toroidal portion 22 of the chamber 6 and accommodate the major portions of the energy storing devices 7. The surfaces surrounding the recesses 23, 24 confine the adjacent convolutions 8a in the axial direction of the damper 1 as well as against movement radially outwardly away from such axis.

When the damper 1 is caused to rotate about the common axis of the flywheels 2 and 3, the radially outer portions of the convolutions 8a are caused to move radially outwardly and, in the absence of any undertaking to the contrary, to bear against the internal surfaces of the walls 17 and 18. Therefore, at least the surfaces bounding the arcuate recesses 23, 24 are hardened or, in the alternative, the entire walls 17, 18 are made of a suitably hardened and hence highly wear resistant material. FIGS. 1 and 2 show a liner 25 of hardened metal or other suitable highly wear-resistant material which bounds the internal surfaces of the radially outer portions of the recesses 23, 24 to be engaged by the radially outer portions of the convolutions 8a when the damper 1 is driven by the internal combustion engine. This renders it possible to make the walls 17, 18 of a less expensive metallic sheet material. The liner 25 can consist of two parts one of which is installed radially outwardly of the spring 8 of the fully illustrated energy storing device 7 and the other of which is located radially outwardly of the larger-diameter spring of the other device 7.

An advantage of the liners 25 is that they cooperate with the adjacent convolutions 8a to establish an RPM-dependent frictional engagement with the coil springs 8 to thus oppose changes in the lengths of the springs 8, i.e., angular movements of the flywheels 2 and 3 relative to each other.

The character 26 denotes in FIG. 1 that portion of the hub of the flywheel 2 which is surrounded by and carries the inner race of the ball bearing 4. The outer race of this bearing is surrounded by the radially innermost portion of the secondary flywheel 3.

FIG. 2 shows that the width of the arms 16 (as seen in the circumferential direction of the flywheels 2 and 3) is less than the distances between neighboring two-piece stressing components 14, 15. This ensures that, starting from the neutral positions shown in FIG. 2, the two flywheels 2, 3 have a certain freedom of angular movement relative to each other in a clockwise as well as in a counterclockwise direction. Such movements take place without causing the energy storing devices 7 to store energy or to store additional energy.

FIGS. 2 and 2a show that the wires which have been converted into the springs 8 and 9 are convoluted in the same direction. The character 27 denotes that end portion of the coil spring 8 which is adjacent to the end 38 of the respective energy storing device 7. This end portion 27 includes at least two complete convolutions 8a which are denoted by the character 27a.

At least the radially inner portions of the end convolutions 27a abut each other or are closely adjacent each other even in the unstressed condition of the spring 8. On the other hand, the radially outermost portions of the end convolutions 27a are spaced apart from each other (as seen in the direction of the axis 31) even when the spring 8 is stressed by the respective components 14–15 and 16. However, if the springs 8 and 9 are straight (reference may be had to FIG. 2 of the aforementioned U.S. Pat. No. 5,456,634), the radially outermost portions of the end convolutions 27a can abut each other, the same as the radially innermost portions of such end convolutions. For example, the spacing between the radially outermost portions of the end convolutions 27 can be in the range between zero and one millimeter.

It is presently preferred to select the lead of the end convolutions 27a in such a way that it is as small as permitted by the selected diameter of the wire of which the coil spring 8 is made. The length of the end portion 27 of the spring 8 shown in the left-hand portion of FIG. 2 (as seen in the direction of the axis 31) is or can be selected in such a way that it comprises between two and five end convolutions 27a. The number of end convolutions 27a can exceed five; however, this entails a reduction of the capacity or ability of the energy storing device 7 to absorb shocks. This will be readily appreciated since at least the radially innermost portions of neighboring end convolutions 27a are in permanent contact with each other. In other words, the radially innermost part of the end portion 27 always acts as a solid block which cannot undergo further deformation and, therefore, cannot absorb energy.

The intermediate convolutions 8a of the spring 8 (some of these intermediate convolutions are identified by the characters 27b) are normally spaced apart from each other to an extent depending upon the lead of the convoluted wire which constitutes the spring 8 and upon the initial stress of this spring. When the spring 8 is caused to store energy in response to angular displacements of the flywheels 2, 3 relative to each other, the radially innermost portions of the intermediate convolutions 27b may but need not actually contact each other.

The end convolutions 27a and the intermediate convolutions 27b of the coil spring 8 which is fully shown in FIG. 2 have identical average diameters 28 (see FIG. 2a). However, it is equally within the purview of the invention to convolute a length of wire into a coil spring 8 in such a way that the average diameters 28 of the end convolutions 27a depart from the average diameters of the intermediate convolutions 27b. For example, the average diameters 28 of the end convolutions 27a can be smaller (e.g., only slightly smaller) than those of the intermediate convolutions 27b. Furthermore, the coil spring 8 can be configurated in such a way that the lead (inclination) of all of the intermediate convolutions 27b is not the same. For example, the coil spring 8 can be designed in such a way that a first section containing one or more intermediate convolutions 27b having a first lead is followed by a second section of one or more intermediate convolutions 27b having a different second lead, such second section is followed by a third section identical with the first section, the third section is followed by a fourth section identical with the second section, and so forth.

In accordance with one presently preferred embodiment, the lead of the convolutions 8a increases from the ends toward the center of the coil spring 8; such center may but need not be exactly midway between the two ends 27 of the coil spring 8.

FIG. 2a shows that at least one end 29 of the inner coil spring 9 can comprise at least one complete end convolution 30; the illustrated end 29 actually comprises nearly three complete end convolutions 30. The purpose of the end convolution or convolutions 30 is to cooperate with the adjacent end convolution(s) 27a in such a way that the end convolution(s) 30 is or are compelled to share movements of the end convolution(s) 27a in response to angular movements of one of the flywheels 2, 3 relative to the other flywheel in a clockwise and/or in a counterclockwise direction. This is accomplished in that the radially outermost portions of the end convolutions 30 overlie the radially innermost portions of the neighboring end convolutions 27a. Such radial overlap may but need not take place along an arc of 360°. FIG. 2a shows that the outer diameters 33 of the end convolutions 30 are only slightly larger than the inner diameters 34 of the end convolutions 27a. The arrangement which is shown in the right-hand portion of FIG. 2a is such that at least one end convolution 30 is confined between two neighboring end convolutions 27a to ensure that such cooperating end convolutions 30 and 27a share all movements in the direction of the common axis 31, i.e., in response to a clockwise or counterclockwise turning of the flywheels 2, 3 relative to each other. It is often preferred to design the cooperating ends 27, 29 of the coil springs 8, 9 in such a way that at least two end convolutions 30 are boxed in between the neighboring end convolutions 27a.

FIG. 2a further shows that the outer diameters 36 of the convolutions 9a which are immediately adjacent the end convolutions 30 (one of these convolutions 9a is denoted by the character 35) are slightly smaller than the inner diameters (34) of the adjacent intermediate convolutions 27b; at most, the diameters 36 approximate the inner diameters 34.

The length of the end portion 29 can match or even slightly exceed the length of the end portion 27.

When the springs 8 and 9 are assembled into an energy storing device 7 in a manner as shown in FIG. 2, the end convolutions 30 can be received between the neighboring end convolutions 27a with at least some (e.g., minimal) radial and/or axial play. However, it is equally possible to assemble the end portions 27, 29 in such a way that the end convolutions 30 actually bear against the adjacent pairs of convolutions 27a, i.e., that the end portions 27, 29 cooperate with each other without any or with a negligible radial and/or axial play. In fact, it is often advisable or desirable to assemble the end portions 27, 29 of two interfitted coil springs 8, 9 in such a way that the end convolutions 30 bear upon the adjacent end convolutions 27a with a considerable force so that the end convolutions 30 and/or the end convolutions 27a undergo a certain extent of deformation upon completion of introduction of the coil spring 9 into the coil spring 8. This is shown in FIG. 2a, as at 32.

A reasonably tight fit of the inner spring 9 in the surrounding spring 8 is particularly desirable when the springs are straight (reference may be had again to FIG. 2 of U.S. Pat. No. 5,456,634) because a frictional engagement between the end convolutions 30 and the surrounding end convolutions 27a reduces the likelihood of turning of the interfitted straight springs relative to each other. Such turning is much less likely when the coil springs are curved in a manner as shown in FIGS. 2 and 2a of the present application.

In order to assemble an energy storing device 7 of the type shown in FIG. 2, the inner coil spring 9 can be forcibly introduced into the outer coil spring 8 until the end convolutions 30 engage the adjacent end convolutions 27a with what can be termed a snap action or clamping action. Such retention of the spring 9 in the spring 8 in an optimal or desired axial position by snap action necessitates at least some elastic deformation of the convolutions 8a by the convolutions 9a and/or vice versa during advancement of the end convolutions 30 toward and into engagement with the respective end convolutions 27a.

If the difference between the diameters 33, 34 shown in FIG. 2a is rather pronounced or quite pronounced, the coil spring 9 can be screwed into the internal space 37 of the coil spring 8 not unlike the shank of a screw or bolt is introduced into a tapped bore or bole.

The just mentioned mode of introducing the coil spring 9 into the space 37 defined by the convolutions 8a of the coil spring 8 is possible and advantageous if the wire which is converted into the coil spring 9 is convoluted in the same direction as the wire which is converted into the coil spring 8. This is shown in FIGS. 2 and 2a. The lead of the convolutions 9a may but need not be identical with that of the convolutions 8a; for example, the lead of the convolutions 9a can be slightly smaller than that of the convolutions 8a. Such selection of the inclination of the convolutions 8a and 9a is particularly desirable when the exposed side of the end portion 27 should be coplanar with the exposed side of the end portion 29 in a manner shown in FIG. 2a, i.e., when the exposed radially extending sides of the end portions 27, 29 should be located in a common plane further including the end 38 of the energy storing device 7 and being normal to the arcuate common axis 31 of the springs 8 and 9.

FIG. 2a shows that the lead of that intermediate convolution of the coil spring 9 which is denoted by the character 35 (as well as of the adjacent convolutions of the coil spring 9) is smaller than that of the surrounding intermediate convolutions 27b of the coil spring 8. Such selection of the leads of the convolutions 35 and 27b reduces the likelihood that these convolutions would interlock in actual use of the energy storing device 7, i.e., this ensures that the convolutions 27b can move relative to the convolutions 35 (and vice vesa) in the direction of the common axis 31 of the coil springs 8 and 9. The convolutions 35 would be particularly likely to become enmeshed with the adjacent intermediate convolutions 27b when the damper 1 is caused to rotate at a high or very high speed because the convolutions 35 then tend to move radially outwardly under the action of centrifugal force. If the leads of the convolutions 35 are different from those of the surrounding convolutions 27b, the convolutions 35 are likely to abut against the convolutions 27b under the action of centrifugal force but the convolutions 35 cannot penetrate into the helical grooves between neighboring convolutions 27b.

FIG. 2a shows that the coil springs 8 and 9 are more or less positively coupled to each other at the end 38 of the energy storing device 7, i.e., that the end convolutions 27a and the end convolutions 30 mesh or similarly engage each other adjacent the respective stressing components 14–15 and 16. However, it is equally possible (and often desirable) to establish a more or less positive connection between the coil springs 8 and 9 at a location 10 which is spaced apart from the ends 38, 39 of the respective energy storing device 7. Such modification is shown in and will be described with reference to FIGS. 8 and 9.

As already mentioned hereinbefore, the diameter of the wire which is converted into the coil spring 8 can but need not be the same as that of the wire which is converted into the coil spring 9. It is often desirable or advisable to make the coil spring 9 of a wire having a diameter smaller than that of the wire which has been converted into the coil spring 8.

The edge faces of the stressing components or arms 16 and the surfaces of the portions 14, 15 of the stressing components on the walls 17, 18 can be configured in such a way that they lie flush agaist the end faces of the convolutions 27a, 30 at the end 38 and against the end face of the end convolution of the coil spring 8 at the end 39 of the energy storing device 7.

The diameters of the wires of which the springs 8 and 9 are made, the leads of the convolutions 8a and 9a, the length 11 of the spring 9 and the length 12 of the spring 8 are or can be selected in such a way that the radially innermost portions of the convolutions 8a abut each other in response to maximum clockwise or counterclockwise angular displacement of the flywheels 2 and 3 relative to each other. However, it is also possible to select the aforementioned parameters in such a way that a maximal angular displacement of the flywheels 2 and 3 relative to each other entails a full (maximum possible) compression (shortening) of the coil spring 9 or of both coil springs.

It is often preferred, particularly for the convenience of interfitting the springs 8 and 9 into each other as well as for installation of the thus obtained energy storing devices 7 between the respective pairs of stressing components 14–15 and 16, to impart to the coil spring 9 and/or to the coil spring 8 an arcuate shape (with a curvature corresponding to or matching that of the axis 31) prior to insertion of the spring 9 into the spring 8 and/or prior to insertion of an energy storing device 7 into the chamber 6. Such precurving of the spring 9 and/or 8 is desirable on the additional ground that the resulting energy storing device is more likely to perform its function in the desired manner when the damper 1 is in actual use.

However, it is equally within the purview of the invention to impart to the coil spring 8 and/or 9 a curvature which departs from the curvature of the fully assembled energy storing device 7. For example, such expedient can be resorted to if the tensioning of the fully assembled energy storing device 7 in the neutral positions of the flywheels 2, 3 and/or in certain other angular positions of the two flywheels relative to each other should depart from that expected from an energy storing device with two interfitted coil springs which were fully precurved prior to introduction of the spring 9 into the spring 8. For example, the curvature of at least one of the springs 8, 9 can exceed the curvature of the axis 31 before the springs are fitted into each other to form the energy storing device 7.

It is also possible to select the initial curvatures of the springs 8 and 9 in such a way that the curvature of one of these springs is greater and the curvature of the other spring is less than that of the axis 31 of the fully assembled energy storing device 7.

FIG. 2 further shows that the overall length of the coil spring 8 (as measured along the axis 31) can greatly exceed the outer diameter of such spring; for example, the outer diameter of the spring 8 can be between 5% and 10% of the length of the axis 31. Such selection of the diameter-to-length ratio of the coil spring 8 is desirable and advantageous if the flywheels 2 and 3 are expected or required to turn relative to each other through large or very large angles.

The useful life of the coil springs 8 and 9 can be extended (especially as regards their resistance to breakage can be enhanced) by making and treating the springs in a manner as disclosed in published German patent application Serial No. 42 29 416. Furthermore, the useful life of the coil springs 8, 9 (and hence of the energy storing device 7) can be prolonged (and their ability to remain in fully compressed conditions for extended periods of time can be enhanced) by imparting to the wires of which these springs are made a cross-sectional outline as disclosed in published German patent application Serial No. 44 06 826. This publication also describes a method of imparting to the wire the desirable cross-sectional outline.

As already mentioned above, the partly illustrated right-hand energy storing device 7 of FIG. 2 is or can be a mirror image of the fully illustrated device 7. This exhibits the important advantage that, once installed in the toroidal portion 22 of the chamber 6, the two energy storing devices 7 fully balance each other, i.e., the installed devices 7 do not tend to move the flywheels 2 and 3 from their neutral positions. FIG. 2 further shows that, in accordance with a presently preferred embodiment, the end portions 27, 29 of the coil springs 8, 9 forming part of the left-hand energy storing device 7 are located diametrically opposite the corresponding end portions of the springs 8, 9 forming part of the right-hand energy storing device 7. Otherwise stated, the end 38 of the left-hand device 7 is adjacent the end 39 of the right-hand device 7 and vice versa.

Of course, proper balancing of the damper 1 and its flywheels 2, 3 is further enhanced due to the afore-discussed anchoring of the end convolutions 30 between the adjacent end convolutions 27a in each of the two energy storing devices 7.

It is further possible to assemble each of the energy storing devices 7 in such a way that it comprises a one-piece outer coil spring 8 and two or more inner coil springs 9 in the space 37 of the outer coil spring. For example a relatively short inner spring 9 can be installed in a manner as shown in the left-hand portion of FIG. 2, and a second relatively short spring 9 can be installed adjacent the end 39 of the left-hand device 7. The two springs 9 in the space 37 of the spring 8 can be mirror images of each other. The confronting ends of the two relatively short springs 9 in the outer spring 8 may but need not abut each other.

If an outer coil spring 8 confines several inner springs, the spring gradients of the inner springs may but need not be the same. It is often desirable to employ several (e.g., two) inner springs which have at least slightly different spring gradients.

An important advantage of an energy storing device 7 wherein the length (12) of the outer coil spring 8 exceeds the length (11) of the inner coil spring 9 is that the damper 1 then acts as a multi-stage damper which offers a first resistance to a first stage of angular movements of the flywheels 2, 3 relative to each other and which thereupon offers a different second resistance to a second stage of turning of the flywheels relative to each other.

It is further possible to install a single coil spring 9 in the coil spring 8 in such a way that both ends of the spring 9 are spaced apart from the ends of the spring 8. Still further, it is possible to assemble an energy storing device in such a way that one end portion of the inner spring 9 extends outwardly beyond the respective end portion of the outer spring 8. In the latter instance, the locus (such as at 10) where the two coil springs are coupled to each other is preferably spaced apart from both ends of the outer spring. In such energy storing devices, the inner spring preferably includes a set of convolutions which extend from the aforementioned locus to the adjacent end of the outer spring and are capable of undergoing deformation in the axial direction of the energy storing device.

As already mentioned hereinbefore, the inner and outer springs can have a common arcuate axis (31) or a common straight axis.

FIGS. 3 to 6 illustrate certain details of an energy storing device 107 which constitutes a modification of the energy storing devices 7 shown in FIGS. 1, 2 and 2a. The device 107 comprises an outer coil spring 108 and an inner coil spring 109 which latter can be coupled to the spring 108 in a manner as described with reference to the end portions 27, 29 of the coil springs 8 and 9 shown in FIG. 2a. The common axis 131 of the coil springs 108, 109 is but need not be a straight axis or is but need not be an arcuate axis.

An important difference between the mode of engagement of end convolutions 27a, 30 of FIG. 2a and the mode of engagement between the end convolutions 127a, 130 of the springs 108, 109 is that the engagement between the convolutions 127a, 130 does not take place along an arc of 360°. The reason is that the end convolution 130 of the inner coil spring 109 has a non-circular (namely oval) outline so that it engages only relatively small portions of the adjacent convolutions 127a (see particularly FIG. 4).

Figure 6:
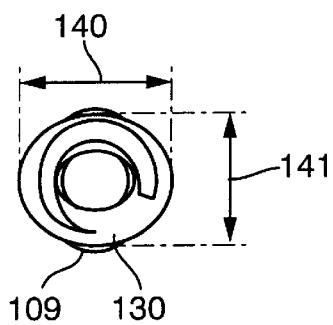
FIG. 6 is an end elevational view of the second or inner coil spring in the energy storing device of FIGS. 3 to 5.

FIG. 6 shows that the major axis 140 of the ellipse formed by the end convolution 130 of the spring 109 can consid-erably exceed the minor axis 141. The minor axis 141 is preferably smaller than the inner diameter 134 of each end convolution 127a of the coil spring 108 (see FIG. 5). On the other hand, the inner diameter 134 of each end convolution 127a is smaller than the major axis 140 of the ellipse; this causes a relatively small radial overlap between the end convolutions 127a, 130 and the retention of the end convolution or convolutions 130 in a preselected axial position relative to the outer coil spring 108. This can be best seen in FIG. 4.

The intermediate convolutions 135 of the inner spring 109 (i.e., those convolutions which are adjacent the end convolution(s) 130) are free to move axially within the intermediate convolutions 127b of the outer coil spring 108 in the same way as described in connection with the convolutions 35 and 27b of the coil springs 8 and 9 shown in FIGS. 2 and 2a.

The engagement between the convolutions 127a and 130 need not take place at the one or the other axial end of the coil spring 108 or 109. Thus, at least one of the springs 108, 109 can extend downwardly and beyond the convolutions 127a, 130 shown in FIG. 4.

It is presently preferred to form the elliptical or oval end convolution or convolutions 130 by deforming one or more originally circular or substantially circular convolutions of the coil spring 109. For example, the originally circular end convolution(s) 130 can be flattened as a result of compression between an upper jaw and a lower jaw (as viewed in FIG. 6). Such deformation can take place in a cold forming machine. Alternatively, the end convolution or convolutions 130 can be heated prior to the deforming step. Still further, it is possible to design a winding machine in such a way that the inner coil spring 109 is formed with one or more non-circuar convolutions 130 at the time a length of wire is being converted into the spring 109.

In accordance with a presently preferred method, a length of wire is converted into the inner coil spring 109 in such a way that the convolution or convolutions 130 is or are identical with the circular convolutions 135. A next-following step involves a deformation of the end convolution(s) 130 in a cold forming machine to convert the originally circular convolution(s) 130 into oval convolution(s) of the type shown in FIG. 6.

Of course, it is equally possible to assemble the energy storing device or devices 7 or 107 in such a way that circular intermediate or end convolutions (such as 30 or 130) are caused to engage non-circular intermediate or end convolutions (such as 27a or 127a) of the outer coil spring 8 or 108. Still further, it is possible to provide the inner coil spring 9 or 109 with one or more non-circular (such as oval) convolutions which are dimensioned to engage non-circular (such as oval) convolutions of the outer coil spring 8 or 108.

Figure 7:
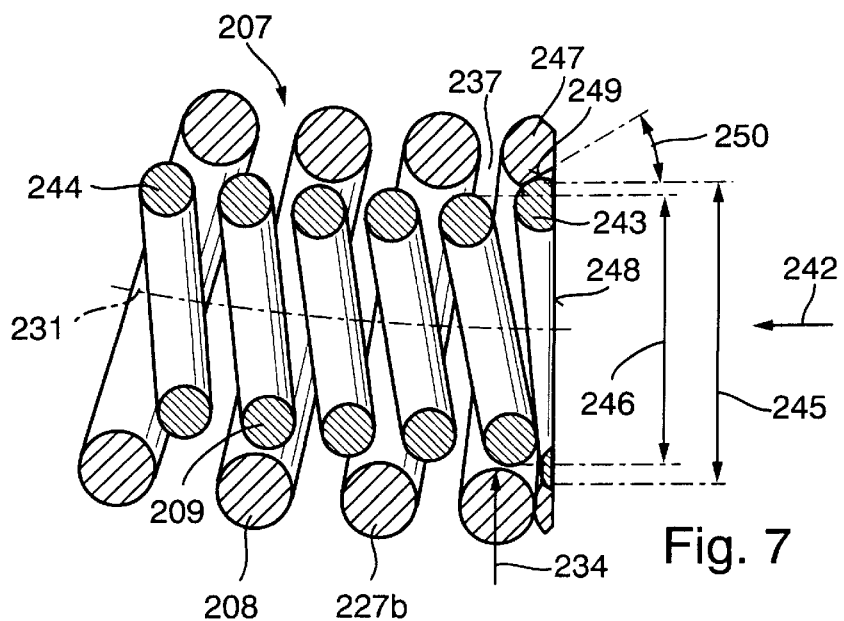
FIG. 7 is a fragmentary axial sectional view of a third energy storing device.

FIG. 7 shows a portion of a further energy storing device 207 with an inner coil spring 209 and an outer coil spring 208. The end convolution 243 of the inner spring 209 is prevented from moving axially (arrow 242) relative to the adjacent convolutions of the outer spring 208 because the end convolution 247 of the spring 208 is provided with a facet or flat 249 serving as an abutment for the end convolution 243. The outer diameter 245 of the end convolution 243 is at least slightly larger than the inner diameter of the facetted end convolution 247. On the other hand, the outer diameters 246 of the adjacent intermediate convolutions 244 of the inner spring 209 are smaller than the inner diameters of the intermediate convolutions 227b of the outer spring 208.

The end convolution 243 and/or 247 is a circular convolution; however, it is equally possible to deform an originally circular convolution 247 or 243 into an oval or otherwise configurated non-circular convolution which, as a result of such deformation, is capable of ensuring that one or more selected convolutions of the coil spring 209 cannot move axially relative to one or more selected convolutions of the coil spring 208. Still further, it is possible to deform one or more convolutions of the spring 208 and/or 209 to impart thereto a triangular or other polygonal shape, and the same holds true for the end convolutions 127a, 130 and/or 27a, 30. All that counts is that, once the selection was made to axially couple certain convolutions of the inner an outer coil springs to each other by imparting to the selected convolution(s) of the inner and/or outer spring a non-circular shape, the selected convolution(s) can be deformed (e.g., in a cold forming machine) in a number of ways and into any one of a number of different non-circular shapes, as long as this enables selected convolutions of the inner and outer coil springs to reliably engage each other for joint movement when the input and output members of the torsional vibration damper are caused to turn relative to each other in a clockwise and/or in a counterclockwise direction.

The end convolutions 243 and 247 which are shown in FIG. 7 have a lead which is a minimal lead permitted by the selected diameters of the wires which were utilized to form the coil springs 209 and 208. Furthermore, the right-hand sides of the end convolutions 243, 247 have undergone a treatment in a grinding or another suitable material removing machine which has provided these end convolutions with flat surfaces extending at right angles to the adjacent portion of the common axis 231 of the springs 208 and 209. The common plane of such ground surfaces is shown at 248. The facet 249 makes with the adjacent portion of the axis 231 an acute angle 250 which can approximate or can be less than 45°. The orientation and the inner diameter of the facet 249 are such that the end convolution 243 of the inner spring 209 cannot penetrate into the space 237 between the end convolution 247 and the adjacent convolution 227b of the outer coil spring 208.

The facet 249 can be formed in a grinding machine, and the presently preferred angle 250 is between 27° and 40°. The reference character 234 denotes the inner diameters of the convolutions 247 and 227b; these inner diameters are greater than the outer diameters 246 of the intermediate convolutions 244 but smaller than the outer diameter 245 of the end convolution 243.

All other features of the energy storing device 207 are or can be identical with those of one of the energy storing devices 7 or the energy storing device 107.

It will be seen that the wire which was utilized to make the inner coil spring 209 is convoluted in a first direction and the wire which was utilized to make the coil spring 208 is convoluted in the opposite direction. The same holds true for the coil springs 108, 109 of the energy storing device 107 shown in FIGS. 3 to 6. An important advantage of such winding of the coil springs 108, 109 and 208, 209 is that the intermediate convolutions 135 cannot penetrate into the helical grooves between the intermediate convolutions 127b, and that the intermediate convolutions 244 cannot penetrate into the helical grooves between the intermediate convolutions 227b, even if the damper embodying the energy storing device 107 or 207 is rotated at a very high speed, i.e., even if the damper employing such energy storing devices initiates the generation of very pronounced centrifugal forces tending to push the intermediate convolutions 135, 244 radially outwardly toward the adjacent intermediate convolutions 127b, 227b. Penetration of the inner intermediate convolutions 135, 244 between the adjacent outer intermediate convolutions 127b, 227b is undesirable because the inner convolutions could become clamped between the adjacent outer convolutions and this would affect the operation of the energy storing device.

Referring again to FIGS. 1, 2 and 2a, the coupling including the end convolutions 27a and 30 can be replaced with an entirely different coupling, namely by displacing one or more intermediate convolutions 35 radially of the axis 31 so that the thus displaced (e.g., circular) convolutions 35 would engage the adjacent intermediate convolutions 27b of the outer coil spring 8. If such mode of coupling selected convolutions of the springs 8 and 9 is being resorted to, it is advisable to displace at least two neighboring intermediate convolutions 35 radially of the axis 31 and into engagement with the adjacent intermediate convolutions 27b.

It goes without saying that the same procedure can be resorted to in order to couple selected intermediate convolutions 135 to the adjacent intermediate convolutions 127b and/or to couple selected intermediate convolutions 244 to the adjacent intermediate convolutions 227b.

The springs of the improved energy storing devices are or can be made of steel wire.

FIGS. 3–6 and 7 show that the lead of the convolutions of the inner spring 109 or 209 is less than that of the outer spring 108 or 208. However, it is also possible to reverse such relationship. The same holds true for the coil springs 8 and 9 of the energy storing devices 7 shown in FIGS. 1, 2 and 2a.

In each of the illustrated embodiments, the inner and outer coil springs can be interfitted in such a way that they establish a certain amount of angular play between the input and output members of the torsional vibration damper. For example, the end convolutions 30 of the inner coil spring 9 shown in FIG. 2a can have a certain amount of angular play relative to the adjacent end convolutions 27a when the flywheels 2 and 3 are caused or permitted to assume their starting or neutral positions. On the other hand, the improved energy storing device can also be utilized under circumstances when the input and output members of the torsional vibration damper should be maintained in their neutral positions without any or with minimal or negligible angular play. To this end, one can resort to the solution which is shown in FIGS. 3 to 6, i.e., wherein at least one end convolution 130 bears radially outwardly against the adjacent end convolutions 127a so that the respective end portions of the coil springs 108, 109 are held against any axial movement relative to each other. Thus, all that is necessary to avoid the establishment of a play is to assemble certain convolutions of the inner spring with certain convolutions of the outer spring in such a way that the inner convolutions effect an elastic radially outwardly directed deformation of the adjacent outer convolutions and/or that the radially outer convolutions effect a certain radially inwardly oriented elastic deformation of the adjacent inner convolutions.

It has been found that the improved energy storing device 7 or 107 or 207 operates quite satisfactorily if the axial length of the energy storing device is between five and twenty times the outer diameter of the outer coil spring.

Furthermore in addition to the already discussed presently preferred uses of the improved torsional vibration damper and its energy storing device or devices, the invention can be embodied with equal or similar advantage in many other fields, for example, in pulleys or sheaves wherein coaxial flanges are yieldably held against rotation relative to each other by one or more torsional vibration dampers or analogous dampers.

If the exposed surface of the inner end convolution 243 shown in FIG. 7 need not lie flush with the exposed surface of the outer end convolution 247, i.e., if such exposed surfaces need not be located in the common plane 248, the facet 249 can be provided at the left-hand side of the end convolution 247 or at one side of the adjacent convolution 247b. In each instance, the facet 249 can assume a frustoconical shape with the imaginary apex located on or close to the axis 231.

Figure 8:
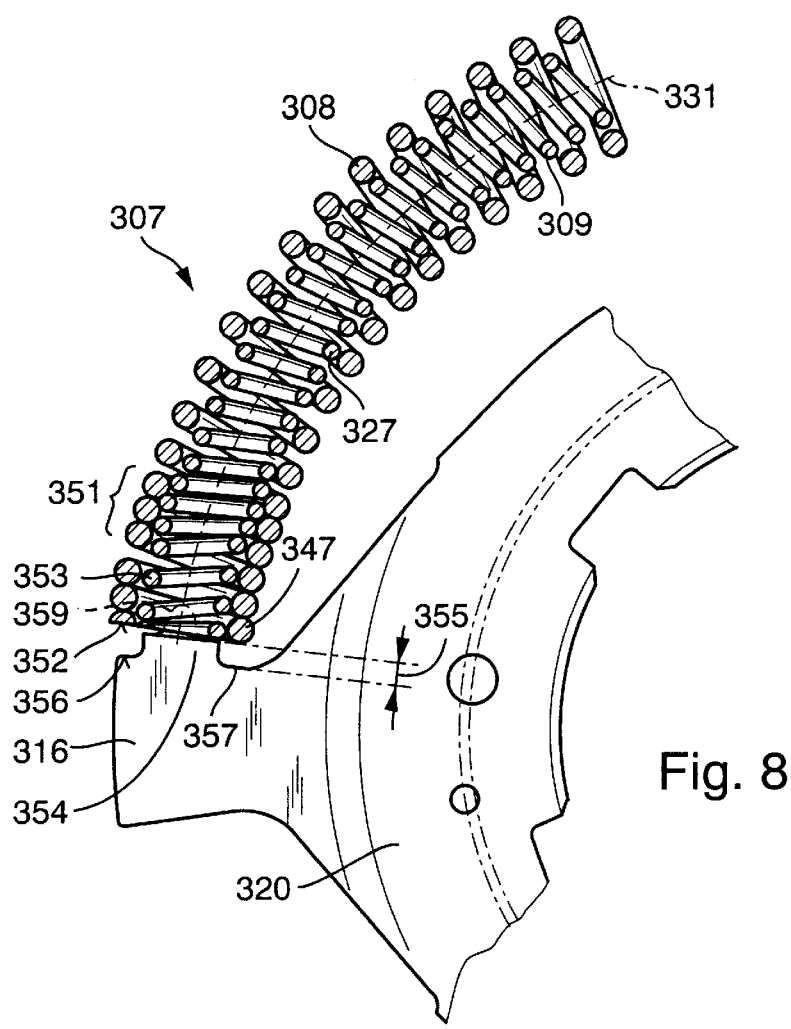
FIG. 8 is a fragmentary partly elevational and partly transverse sectional view of a modified torsional vibration damper with an energy storing device constituting a further modification of those shown in FIGS. 1–2a, 3–6 and 7.
Figure 9:
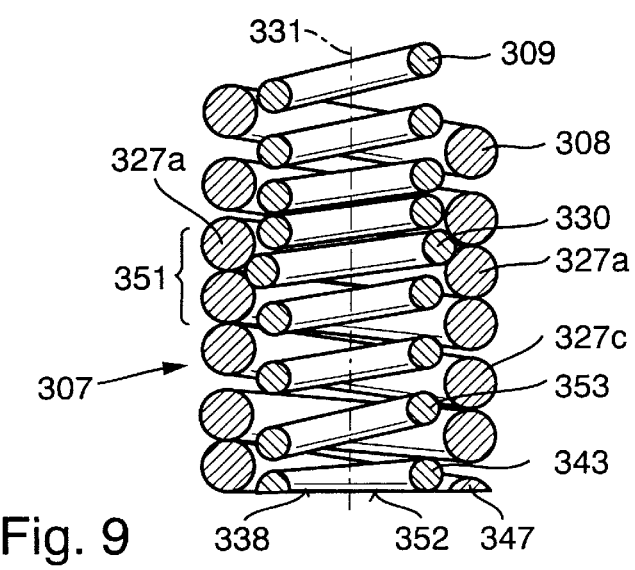
FIG. 9 is an enlarged view of a detail of the energy storing device which is shown in FIG. 8.

FIGS. 8 and 9 show a portion of a damper which comprises at least one energy storing device 307 having a first or outer coil spring 308 and a second or inner helical coil spring 309 telescoped into the internal space of the outer spring 308. The two springs have a common arcuate axis 331 and are mounted in an arcuate portion of an annular chamber corresponding to the chamber 6 in the damper 1 of FIG. 1. FIG. 8 merely shows a portion (namely a disc-shaped member 320) of the secondary flywheel, and the member 320 has several arms 316 abutting the adjacent ends of the respective energy storing devices 307 (only one such device can be seen in each of FIGS. 8 and 9).

Those convolutions 330 of the inner spring 309 which are coupled to the adjacent convolutions 327a of the spring 308 are disposed at a locus 351 which is spaced apart from the ends of the energy storing device 307. This renders it possible to utilize the end convolutions 353 of the inner spring 309 as a means for storing energy when the axial length of the device 307 is reduced in response to angular movement of the input and output members of the damper relative to each other.

The exposed surfaces of the two end convolutions 343, 347 at the end 338 of the energy storing device 307 are treated (such as ground) in the same way as already described with reference to FIG. 7 so that they are located in a common plane 352 normal to the axis 331. Those convolutions (353) of the inner spring 309 which are located between the end convolution 343 and the convolutions 330 engaging the adjacent convolutions 327a of the spring 308 at the locus 351 have outer diameters which are at least slightly smaller than the internal diameters of the convolutions 327c between the locus 351 and the end convolution 347. This enables the convolutions 353 and 327c to move relative to each other in the direction of the axis 331.

The positions of the outer convolutions 347, 327c and 327a relative to each other are selected in such a way that these convolutions abut each other and thus prevent further angular movements of the input and output members of the damper relative to each other before the convolutions 353 of the inner spring 309 come into actual contact with one another. Thus, the convolutions 353 still have at least some minimal freedom of movement relative to each other in the direction of the axis 331 when the convolutions 347, 327c, 327a already form a solid block which prevents any further shortening of the respective portion of the outer spring 308. Such mode of installing the inner coil spring 309 in the outer coil spring 308 ensures that the convolutions 330 at the locus 351 are not subjected to excessive stresses, i.e., that they remain in reliable engagement with the adjacent convolutions 327a. An additional reason that the convolutions 353 cannot overly stress the convolutions 330 at the locus 351 is that the arms 316 are configured in a special manner.

The inner coil spring 309 comprises additional (intermediate) convolutions 327 which extend from the locus 351 toward the non-illustrated end of the energy storing device 307. The median diameters of the (intermediate) convolutions 327 of the inner spring 309 are or can be the same as those of the convolutions 353, and the leads of the convolutions 327, too, can be identical with or very close to the leads of the convolutions 353. Therefore, the rigidity of that portion of the inner spring 309 which includes the convolutions 327 is or can be identical or very close to the rigidity of the spring portion including the convolutions 353.

However, the just described feature is not critical because it is possible, and often advisable, to design and mount the inner spring 309 in such a way that the rigidity of the portion including the convolutions 327 is different from that including the convolutions 353. This can be readily achieved by designing the convolutions 353 in such a way that their lead exceeds or is less than the lead of the convolutions 353 and/or by selecting for the convolutions 327 an average or median diameter (refer to the median diameter 28 of one of the end convolutions 27a shown in FIG. 2a) which is different from the median diameter of the convolutions 353.

It has been found that it is particularly advantageous if the rigidity of the inner spring portion including the convolutions 353 is somewhat less than that of the portion of the spring 309 which includes the convolutions 327. The spring factor of the energy storing device 307 of FIGS. 8 and 9 can also be varied in that at least one of the springs 308,309 includes sections with convolutions having different leads. The changes between the leads of neighboring groups or sets of convolutions of the inner spring 309 and/or outer spring 308 can be abrupt but are normally gradual.

That portion or section of the inner spring 309 which includes the convolutions 353 can be designed in such a way that all of the convolutions 353 have identical median diameters. Alternatively, at least one of the convolutions 353 can have a median diameter which is smaller than the median diameter or diameters of the adjacent convolution(s) 353. FIG. 8 shows that the median diameters of the convolutions 353 decrease gradually from the locus 351 toward the end 338 of the energy storing device 307 so that, when considered as a unit, the convolutions 353 together form a hollow conical frustum the diameter of which decreases toward the adjacent arm 316.

When the energy storing device 307 is in actual use, e.g., in lieu of the energy storing device 7 shown in the left-hand portion of FIG. 2, an angular displacement of the flywheels 2, 3 from their starting or neutral positions initially entails a displacement of the convolutions 353 of the inner coil spring 309 and thereupon a displacement of the adjacent convolutions 347 of the outer coil spring 308. To this end, each arm 316 of the disc-shaped member 320 (corresponding to the member 20 in the damper 1 of FIGS. 1 and 2) has a projection 354 which is designed to bear against the adjacent convolution 353 and recessed shoulders 356, 357 which thereupon engage the nearest convolution 347 after the projection 354 has completed an angular movement through a distance 355 which corresponds to the angular distance between the top of the projection 354 and the shoulders 356, 357. The dimensions of the projection 354 are selected in such a way that it can enter, without touching, at least the outermost convolution 347 on its way into engagement with the nearest convolution 353. The levels of the two shoulders 356, 357 relative to the level of the top plane of the projection 354 can be selected in such a way that the shoulder 356 engages the nearest convolution 347 simultaneously with the shoulder 357, subsequent to engagement of the shoulder 357 with the nearest convolution 347, or prior to such engagement.

If the damper utilizing the energy storing device 307 of FIGS. 8 and 9 is utilized in the power train of a motor vehicle, the orientation of the projections 354 and shoulders 356, 357 on the member 320 is preferably selected in such a way that the projection 354 stresses the convolutions 353 before the shoulders 356, 357 stress the convolution(s) 347 while the motor vehicle is coasting, i.e., while the wheels cause the differential and the transmission to rotate the secondary flywheel and the secondary flywheel transmits torque to the output element of the engine by way of the primary flywheel. Such situation can develop when the vehicle is rolling downhill while the gas pedal remains undepressed.

When the torsional vibration damper (such as the damper 1 of FIGS. 1 and 2 with energy storing devices 7, 107, 207 or 307 between its flywheels 2 and 3) is in actual use, the primary flywheel 2 stresses the outer coil springs 8, 108, 208 or 308. This causes the arcuate outer coil springs to exhibit a tendency toward movement radially outwardly and to thus bear against the respective wear-resistant liners 25. The frictional engagement between the liners 25 and the adjacent portions of convolutions of the outer coil springs 8, 108, 208 or 308 increases with increasing centrifugal force, i.e., in response to increasing RPM of the primary flywheel 2. If the energy storing devices 7, 107, 207 or 307 are relatively long (i.e., if the stiffness of the outer coil springs is not very pronounced), the convolutions of the outer coil springs are likely to bear against the liners with a force which prevents the outer springs from following return movements of the primary and secondary flywheels toward their neutral or starting positions. It has been found that, when the RPM of the torsional vibration damper is above 1500, the energy storing devices 7, 107, 207 or 307 are likely to remain in compressed condition, due to frictional engagement between the convolutions of the outer coil springs 8, 108, 208 or 308 and the adjacent liners 25, while the stressing components 14–15 and 16 assume positions in which the energy storing devices would be free to dissipate energy. Thus, if a vehicle wherein the power train comprises a torsional vibration damper of the type shown in FIGS. 1 and 2 is accelerated or decelerated, the stressing components 14–15 of the primary flywheel 2 move relative to the stressing components 16 of the secondary flywheel 3 and vice versa but the energy storing devices are incapable of immediately following all movements of the stressing components relative to each other because the frictional engagement between the convolutions of the outer coil springs and the liners 25 is too pronounced. Otherwise stated, the energy storing devices then act not unlike solid blocks which are devoid of any resiliency. Their ability to dissipate energy returns when the friction between the liners 25 and the adjacent portions of convolutions of the outer coil springs 8, 108, 208 or 308 is reduced to a value at which the coil springs can begin to slip relative to the adjacent liners. Such behavior of the energy storing devices is often accompanied by the generation of undesirable noise in the power train of a motor vehicle. The presence of inner coil springs in portions of or the entire internal spaces of the outer coil springs contributes to the generation of noise. Unsatisfactory operation of the energy storing devices is particularly likely to take place during certain stages of operation of a motor vehicle, for example, during coasting of the motor vehicle or during idling of the engine. Such modes of operation are often accompanied by readily detectable noise.

It has been found that a torsional vibration damper which employs energy storing devices 307 of the type shown in FIGS. 8 and 9 is much less likely to generate noise while a motor vehicle is in the process of pulling a load, while the vehicle is coasting or while the engine of the vehicle is idling. The reason is that a substantial or major portion of the inner coil spring 309 (namely the part including the convolutions 353) is free to expand relative to the adjacent convolutions 347 of the outer coil spring 308 as soon as the projection 354 of the member 320 permits the convolutions 353 to dissipate energy. This, in turn, ensures that the outermost convolution 353 can continue to abut the projection 354 while the shoulders 356, 357 are already or still out of contact with the nearest convolution 347. The rigidity of that portion of the inner coil spring 309 which includes the convolutions 353 can be selected by the maker of the energy storing device 307 so that it can best conform to the conditions of use of a torsional vibration damper employing energy storing devices of the type shown in FIGS. 8 and 9.

The energy storing device 307 of FIGS. 8 and 9 can comprise sets of interlocked convolutions 327a, 330 adjacent to both ends of the outer coil spring 308. In other words, the inner coil spring 309 can comprise a set of loose convolutions 353 at both longitudinal ends of the energy storing device 307. The two sets of convolutions 353 can but need not exhibit identical rigidities. For example, the arrangement can be such that the convolutions 353 which are effective while the motor vehicle is in the process of pulling a load are softer (more resilient) than the convolutions 353 of the set which is effective when the motor vehicle is coasting. If the inner coil spring 309 comprises a set of loose convolutions 353 at each of its longitudinal ends, each arm 316 of the disc-shaped member 320 can be provided with two projections 354 and two shoulders 356, 357. The two projections 354 and/or the distances 355 between the projections 354 and the respective pairs of shoulders 356, 357 may but need not be identical. For example, the projection 354 which is effective while the motor vehicle is coasting can be shorter than the projection which cooperates with the respective set of convolutions 353 when the motor vehicle is in the process of pulling a load.

Still further, the convolutions 353 at one or both axial ends of an energy storing device 307 can extend outwardly beyond the outermost convolution(s) 347 at the respective end(s) of the outer coil spring 308. In such instances, the projection or projections 354 of the arms 316 can be omitted or the distance 355 between the top faces of the projections 354 and the respective pairs of shoulders 356, 357 can be shortened. It is also possible to omit the projection or projections 354 and to provide each arm 316 with a recess for one or more end convolutions 347 of the outer coil spring 308.

It is further possible to design each arm 316 of the disc-shaped member 320 in such a way that it counteracts the tendency of at least some convolutions of the outer coil spring 308 to bear against a wear-resistant liner (such as the liners 25 shown in FIGS. 1 and 2) while the energy storing device 307 is being acted upon by centrifugal force. FIG. 8 shows that the projection 354 of the arm 316 is provided with a centering protuberence 359 which extends at least into the adjacent end convolution 343 of the inner coil spring 309 and thus holds the end convolution 343 and preferably also one or more adjacent convolutions 353 from moving radially outwardly and bearing against the adjacent convolution 347 or convolutions 347, 327c of the outer coil spring 308 so that the convolution 347 or the convolutions 347, 327c are less likely to bear upon the liner 25 or to bear upon such liner with a pronounced force such as would reduce the likelihood of disengagement of the convolutions of the outer coil spring 308 from the liner 25 when the energy storing device 307 is otherwise free to expand.

The protuberance 359 can be dimensioned in such a way that it always extends into the adjacent convolution(s) of the inner coil spring 309 or that it extends into such convolution(s) only when the arm 316 is in the process of stressing the energy storing device 307. It has been found that the protuberance 359 enables the arm 316 to influence the frictional engagement between the outer coil spring 308 and the friction resistant liner 25 to a considerable extent.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration dampers and energy storing devices therefor and, therefore, such adaptations should and are intended to be comprehended within the meaning and range of equivalence of the appended claims.

What is claimed is:

1. A torsional vibration damper, comprising:
input and output members rotatable with and relative to each other in clockwise and counterclockwise directions about a predetermined axis and respectively including first and second stressing components; and
at least one energy storing device arranged to oppose rotation of said members relative to each other and having first and second ends each abutting a first and a second component, said ends being spaced apart from each other in a circumferential direction of said members and said device having a longitudinal axis and comprising a first coil spring between said ends and a second coil spring confined at least in part in a space defined by said first coil spring, said first and second coil springs respectively including a plurality of first and a plurality of second convolutions, at least one of said first convolutions cooperating with at least one of said second convolutions to compel said at least one second convolution to share movements of said at least one first convolution in at least one of said directions, said at least one first convolution and said at least one second convolution overlying each other in said space and in a plane which is at least substantially normal to said longitudinal axis and includes said predetermined axis.

2. The damper of claim 1, wherein said first convolutions include an outermost convolution at one end of said device and said second convolutions include an outermost convolution at least partially confined within said outermost convolution of said first convolutions.

3. The damper of claim 1, wherein said second coil spring is shorter than said first coil spring, as seen in the direction of said longitudinal axis.

4. The damper of claim 1, wherein said first and second coil springs respectively consist of first and second wires one of which is convoluted in a clockwise direction and the other of which is convoluted in a counterclockwise directon about said longitudinal axis.

5. The damper of claim 1, wherein said first and second coil springs respectively consist of first and second wires one of which is convoluted in a predetermined direction about said longitudinal axis and the other of which is also convoluted in said predetermined direction.

6. The damper of claim 1, wherein said members are rotatable relative to each other clockwise and counterclockwise from neutral positions in which said device stores a minimal amount of energy, said at least one first convolution and said at least one second convolution being located at one end of said device.

7. The damper of claim 6, wherein said at least one first convolution contacts said at least one second convolution at least in said neutral positions of said members.

8. The damper of claim 1, wherein at least one of said at least one first convolution and at least one second convolution has a non-circular shape.

9. The damper of claim 8, wherein said non-circular shape at least resembles an oval shape.

10. The damper of claim 1, wherein at least said at least one second convolution has a non-circular shape.

11. The damper of claim 1, wherein at least one of said at least one first convolution and said at least one second convolution has a shape which departs from an originally circular shape.

12. The damper of claim 11, wherein said shape which departs from said originally circular shape is arrived at as a result of deformation of the respective convolution.

13. The damper of claim 1, wherein at least one of said at least one first convolution and said at least one second convolution has a non-circular shape imparted to the respective convolution in a cold forming machine.

14. The damper of claim 1, wherein said at least one second convolution is a force fit in said first coil spring.

15. The damper of claim 14, wherein at least said first coil spring consists of a resiliently deformable material and said at least one convolution of said first coil spring is resiliently deformed as a result of force fitting of said at least least one second convolution into said first coil spring.

16. The damper of claim 15, wherein said at least one first convolution of said first coil spring is enlarged as a result of force fitting of said at least one second convolution into said first coil spring.

17. The damper of claim 15, wherein said at least one first convolution of said first coil spring is reduced in size as a result of force fitting of said at least one second convolution into said first coil spring.

18. The damper of claim 1, wherein said springs are elastic and said at least one first convolution engages said at least one second convolution by snap action.

19. The damper of claim 1, wherein said at least one second convolution is threaded into said first coil spring.

20. The damper of claim 1, wherein said springs consist of resilient wire and one of said at least one first and at least one second convolutions is deformed by the other of said at least one first and at least one second convolutions in a direction at least substantially radially of said longitudinal axis.

21. The damper of claim 1, wherein at least one of said coil springs has a curvature corresponding to the curvature of said at least one coil spring prior to at least partial confinement of said second coil spring in said first coil spring.

22. The damper of claim 1, wherein said first coil spring has a first radius of curvature and said second coil spring has a second radius of curvature at least approximating said first radius of curvature.

23. The damper of claim 1, wherein said first coil spring has an outer diameter which is a relatively small fraction of the length of said longitudinal axis.

24. The damper of claim 1, wherein at least one of said members includes a flywheel.

25. The damper of claim 1, wherein said at least one first convolution has at least one facet and said at least one second convolution abuts said at least one facet.

26. The damper of claim 25, wherein said at least one first convolution is disposed at one of said first and second ends of said energy storing device.

27. The damper of claim 1, wherein said at least one first convolution has a facet surrounding at least a major part of said at least one second convolution.

28. An energy storing device for use in a torsional vibration damper, comprising:
   at least one first coil spring having first convolutions defining a space; and
   at least one second coil spring having second convolutions and being at least partially received in said space, at least one of said second convolutions extending in said space beyond at least one adjacent first convolution as considered radially of a longitudinal axis of said energy storing device so that said at least one second convolution is compelled to share movements of said a least one first convolution in at least one direction of said longitudinal axis.

29. A torsional vibration damper, comprising an energy storing device including a first coil spring defining an internal space and having a first set of convolutions including an end convolution having an internal facet; and a second coil spring at least partially received in said space and having a second set of convolutions including at least one convolution located in said space and at least partially surrounded by said facet, said end convolution of said first set having an inner diameter and said at least one convolution of said second set having an outer diameter greater than said inner diameter.

30. A torsional vibration damper comprising an energy storing device having a longitudinal axis, a first end and a second end and including:
   a first coil spring defining an internal space and having a first set of convolutions including end convolutions at the ends of said device and intermediate convolutions between said end convolutions; and
   a second coil spring at least partially received in said internal space and having a second set of convolutions including at least one second convolution cooperating with at least one of said intermediate convolutions in said space to couple said first and second coil springs to each other for joint movement of said at least one intermediate convolution and said at least one second convolution in at least one direction of said longitudinal axis.

31. The damper of claim 30 further comprising input and output members rotatable with and relative to each other about a predetermined axis and having stressing components abutting at least the end convolutions of said first set prior to abutting at least some convolutions of said second set in response to rotation of said input and output members relative to each other.

32. A torsional vibration damper, comprising:
   input and output members rotatable with and relative to each other in clockwise and counterclockwise directions about a predetermined axis and respectively including first and second stressing components; and
   at least one energy storing device arranged to oppose rotation of said members relative to each other and having first and second ends each abutting a first and a second component, said ends being spaced apart from each other in a circumferential direction of said members and said device having a longitudinal axis and comprising a first coil spring between said ends and a second coil spring confined at least in part in a space defined by said first coil spring, said first and second coil springs respectively including a plurality of first and a plurality of second convolutions, said first convolutions having at least substantially identical inner diameters and at least one of said first convolutions cooperating with at least one of said second convolutions to compel said at least one second convolution to share movements of said at least one first convolution in at least one of said directions, said at least one second convolution having a radially outermost portion spaced apart from said longitudinal axis a distance exceeding one-half of one of said inner diameters and said at least one first convolution and said at least one second convolution overlying each other in said space and in a plane which is at least substantially normal to said longitudinal axis and includes said predetermined axis.

33. An energy storing device for use in a torsional vibration damper, comprising:
   at least one first coil spring having first convolutions defining an elongated space; and
   at least one second coil spring having second convolutions and being at least partially received in said space, at least one of said second convolutions in said space extending beyond at least one adjacent first convolution as considered radially of a longitudinal axis of said device so that said a least one first convolution prevents movements of said at least one second convolution in at least one direction of said longitudinal axis.

34. A torsional vibration damper, comprising:
   input and output members rotatable with and relative to each other in clockwise and counterclockwise directions about a predetermined axis and respectively including first and second stressing components; and
   at least one energy storing device arranged to oppose rotation of said members relative to each other and having first and second ends each abutting a first and a second component, said ends being spaced apart from each other in a circumferential direction of said members and said device having a longitudinal axis and comprising a first coil spring between said ends and a second coil spring confined at least in part in a space defined by said first coil spring, said first and second coil springs respectively including a plurality of first and a plurality of second convolutions, at least one of said first convolutions cooperating with at least one of said second convolutions in said space to compel said at least one second convolution to share the movements of said at least one first convolution in at least one direction of said longitudinal axis, said at least one first convolution and said at least one second convolution overlying each other in said space and in a plane which is at least substantially normal to said longitudinal axis and includes said predetermined axis, said first coil spring having a first lead and said second coil spring having a second lead other than said first lead.

35. The damper of claim 34, wherein each of said springs consists of convoluted wire and said wires are convoluted in the same direction.

36. A torsional vibration damper, comprising:
   input and output members rotatable with and relative to each other in clockwise and counterclockwise directions about a predetermined axis and respectively including first and second stressing components; and
   at least one energy storing device arranged to oppose rotation of said members relative to each other and having first and second ends each abutting a first and a second component, said ends being spaced apart from ech other in a circumferential direction of said members and said device having a longitudinal axis and comprising a first coil spring between said ends and a second coil spring confined at least in part in a space defined by said first coil spring, said first and second coil springs respectively including a plurality of first and a plurality of second convolutions, said first convolutions including an end convolution at one end of said energy storing device and said second convolutions including an end convolution at said one end of said energy storing device, said coil springs consisting of wire having a predetermined diameter and at least one of said end convolutions having a lead which is relatively small in comparison with said diameter, at least one of said first convolutions cooperating with at least one of said second convolutions in said space to compel said at least one second convolution to share the movements of said at least one first convolution in at least one direction of said longitudinal axis, said at least one first convolution and said at least one second convolution overlying each other in said space in a plane which is at least substantially normal to said longitudinal axis and includes said predetermined axis.

37. The damper of claim 36, wherein at least one of said end convolutions has a facet located in a plane which is at least substantially normal to said longitudinal axis.

38. A torsional vibration damper, comprising:
input and output members rotatable with and relative to each other in clockwise and counterclockwise directions about a predetermined axis and respectively including first and second stressing components; and
at least one energy storing device arranged to oppose rotation of said members relative to each other and having first and second ends each abutting a first and a second component, said ends being spaced apart from each other in a circumferential direction of said members and said device having a longitudinal axis and comprising a first coil spring between said ends and a second coil spring confined at least in part in a space defined by said first coil spring, said first and second coil springs respectively including a plurality of first and a plurality of second convolutions, at least one of said first convolutions cooperating with at least one of said second convolutions to compel said at least one second convolution to share movements of said at least one first convolutions in at least one of said directions, said at least one first convolution and said at least one second convolution overlying each other in said space and in a plane which is at least substantially normal to said longitudinal axis and includes said predetermined axis, said at least one first convolution and said at least one second convolution being disposed at a locus which is spaced apart from said ends of said energy storing device.

39. The damper of claim 38, wherein said stressing components are arranged to stress at least some convolutions of said plurality of first convolutions prior to stressing of at least some convolutions of said plurality of second convolutions in response to rotation of said input and output members relative to each other.

* * * * *